Oct. 15, 1946.  P. A. PIPER  2,409,310
WEIGHT AND BALANCE INDICATOR
Filed Oct. 26, 1945  2 Sheets-Sheet 1
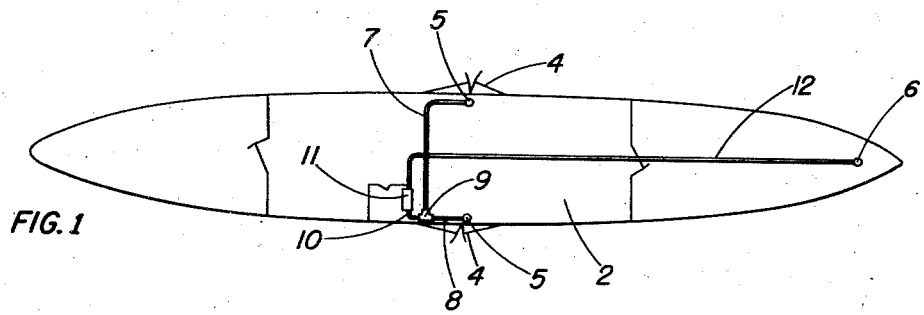
FIG. 1
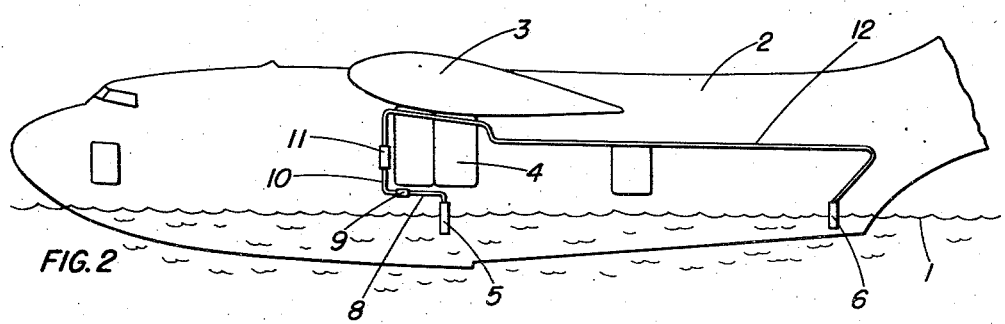
FIG. 2
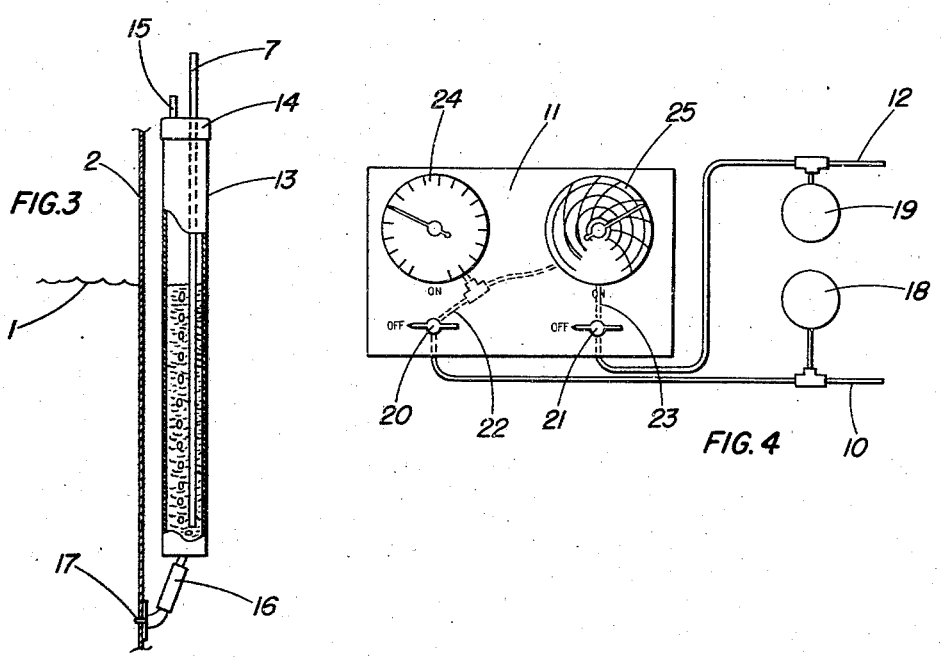
INVENTOR.
PAUL A. PIPER
BY
Donald W. Farrington
ATTORNEY Oct. 15, 1946.    P. A. PIPER    2,409,310
WEIGHT AND BALANCE INDICATOR
Filed Oct. 26, 1945    2 Sheets-Sheet 2

INVENTOR.
PAUL A. PIPER
BY
Donald W. Farrington
ATTORNEY

Patented Oct. 15, 1946

2,409,310

UNITED STATES PATENT OFFICE 2,409,310

WEIGHT AND BALANCE INDICATOR

Paul A. Piper, Towson, Md., assignor to The Glenn L. Martin Company, Middle River, Md., a corporation of Maryland Application October 26, 1945, Serial No. 624,721

4 Claims. (Cl. 73—65)

This invention relates to apparatus for accurately determining the weight and center of gravity of a seaplane afloat. The invention described in this application contains all of the basic principles set forth in my earlier application, Serial No. 512,511, filed December 1, 1943, and embodies details of improvements in the method of operation and arrangement of apparatus in accordance with the method for greater accuracy that will be hereinafter described.

The proper loading of aircraft has troubled designers, and operators since man's first flight, and the problem becomes more and more serious as aircraft increase in size. Modern airplanes are expected to be capable of performing a variety of missions. Commercial operators desire that the payload be changeable at will for all possible combinations of fuel, cargo, and passengers, and for military use it is imperative that fuel, bombs and equipment be varied to suit conditions existing in different theatres of war.

This desirable flexibility of operation has one drawback. It provides the means and the temptation to overload the airplane. Overload is bad enough in its reduction of performance and structural safety, but its effects are even worse when extra load shifts the center of gravity forward or aft of a very restricted range. Control of the airplane becomes exceedingly difficult and, in extreme cases, the airplane is unsafe to fly.

Proper loading is a matter of safety, affecting lives and costly equipment. Accurate knowledge of the loaded weight and center of gravity location for every flight would eliminate one more source of accidents.

In flying boats intended to carry relatively large payloads, it is very important that the center of gravity and gross weight of the loaded flying boat be known for take-off because of the greater effect on the hydrodynamic and aerodynamic characteristics of the airplane.

In the past, manufacturers and commercial operators have recognized the importance of proper aircraft loading. Comprehensive weight control procedures have been established. The loaded weight and center of gravity are obtained by calculating the weight and balance effect of all changes to the basic airplane, as well as the variations in useful load which occur on different flights. Loading handbooks, charts, graphs and mechanical computers have been introduced to simplify the necessary calculations.

Proper recognition should be accorded to the present methods of operational weight control. They are a vast improvement over the inadequate and inflexible methods of the past, and they have effected a gratifying increase in flying safety. Nevertheless, loading calculations require much bookkeeping. This work must be done by trained personnel, and it is always subject to human error. This work, done by an automatic weight and balance indicator, would not only be more rapid and accurate, but would release trained personnel for other duties.

For this reason, it has been found desirable to install in flying boats hydrostatic weight and balance indicators which will give the gross weight and center of gravity when the boat is at rest on the water and that are more or less independent of the rough surface of the water. Since the gross weight and center of gravity must be known within relatively narrow limits, water line measurements cannot be depended upon, except in water under "mill pond" conditions.

This invention provides for an accurate determination of center of gravity and gross weight in a seaplane, the former is the most important because the take-off of the airplane may be seriously impaired if the center of gravity is not within predetermined limits. With the device such as herein disclosed where the center of gravity can be accurately and quickly determined it is a simple matter to move or shift some of the load to bring the center of gravity of a seaplane to the proper position before a take-off is attempted. This insures the proper performance of a seaplane and effects a greater saving in time through eliminating unsuccessful attempts to take-off due to improper loading of the seaplane. The device of this invention does not take care of weight and balance changes during flight. However, with accurate knowledge of certain factors at take-off, it is a simple matter to check the effect of the crew movement and fuel consumption with the mechanical balance computer.

By this invention, means is provided for determining the center of gravity and gross weight of a seaplane afloat.

Another object of this invention is the provision of equipment located and installed on the seaplane hull to give a maximum of precision and accuracy in determining center of gravity and gross weight with a minimum of equipment.

Another object of this invention is the provision of center of gravity and gross weight indicating apparatus which is simple and rugged in its construction so that it requires a minimum of service to maintain its accuracy.

Another object of this invention is to provide apparatus for determining the center of gravity of a seaplane afloat which center of gravity can be readily corrected with changes in the gross weight of the seaplane.

Further and other objects will become apparent from the description of the accompanying drawings which form a part of this disclosure and in which like numerals refer to like parts.

In the drawings:

Figure 1 is a diagrammatic plan view of a seaplane showing the installation of this invention.

Figure 2 is a diagrammatic elevational view showing the installation.

Figure 3 is a sectional view through the hull showing the installation of the standpipe.

Figure 4 is a diagrammatic view showing the instrument panel.

Figure 5:
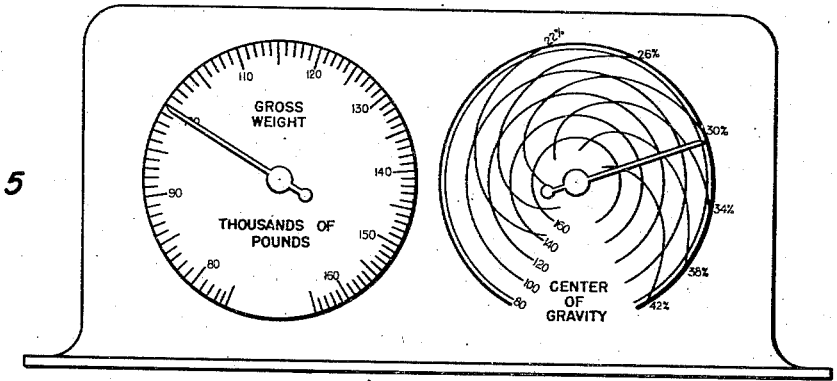
Figures 5, 6 and 7 show arrangements of the dials on the instrument panel for carrying out the invention.

The seaplane shown in Figure 2 is afloat in water with a water line indicated at 1. The hull of the seaplane 2 has mounted thereon wing 3. Cargo loading doors 4 are located under the wing so that the loading of cargo takes place substantially in the plane of the center of gravity of the seaplane. Pressure measuring devices 5 and 6 are located along the water line on the hull. Pressure measuring devices 5 are located substantially in the plane of the aerodynamic center of gravity of the seaplane. By aerodynamic center of gravity is meant the optimum location of the center of gravity of the airplane and load for aerodynamic purposes. This location falls within the wing and is generally expressed in percent mean aerodynamic chord. Two devices 5 are employed in this position, one on each side of the hull. With this arrangement, one or the other will give an indication of draft if the hull is rocking in the water or if one wing droops as is not uncommon in the loading operation, which draft will in any case be a measure of the gross weight of the seaplane and load at this point. Devices 5 work alternatively, depending upon the lateral trim. The essential feature is to have a pressure measuring device located substantially in the plane of the center of gravity of the seaplane. Pressure measuring device 6 can be located toward the rear of the seaplane hull substantially on the center line of the hull. A pipe system including pipes 7 and 8 join at T 9 and pipe 10 is in communication with the pressure gage in panel 11. Line 12 affords communication between pressure measuring device 6 and the pressure gages in panel 11.

The pressure measuring device located at 5 and 6 is shown in more detail in Figure 3. A stand pipe 13 consists of a tube about 1½" in diameter which extends above and below the water line. Stand pipe 13 has a cap 14 through which extends a pressure line which may be either 7, 8 or 12. A vent 15 affords open communication between the space in the top of the stand pipe and the interior of the seaplane hull. The pressure line extends to a predetermined point near the bottom of the stand pipe. This point is a known distance below the designed water line of the seaplane for each installation of stand pipe. A tube 16 affords communication between the bottom of a stand pipe and an aperture 17 in the side of the hull. This aperture is about ⅛" in diameter and is intended to let water flow in from the side of the hull so that the water level in the stand pipe will coincide with the water level outside the hull, but that the water level in the stand pipe will be stabilized by the restriction of orifice 17. It can readily be seen that if a small amount of air from pressure line 7 is bubbled through the water in the stand pipe and permitted to escape from vent 15 that the pressure required to maintain this bubbling condition will be a measure of the depth of water from the end of tube 7 in the stand pipe to the water level in the stand pipe. Since the location of the end of tube 7 is known with respect to the hull of the craft, the pressure required to bubble water in the stand pipe can be converted into a depth dimension which can be used to determine the water line at the point on the hull where the stand pipe is located.

Figure 4 shows diagrammatically how the pressure lines are connected at the panel to convert pressures in the lines adjacent the stand pipes into readings of center of gravity and gross weight. Line 10 in Figure 4 is connected to the two side stand pipes and line 12 is connected to the aft stand pipe. Pumps 18 and 19 are small volume electrically operated air pumps to furnish small amounts of air under pressure to the pressure lines for purposes of bubbling air through the stand pipes. While small electrically operated pumps are employed for this purpose, it is obvious that any suitable source of air presssure may be used. Valve 20 in line 10 and valve 21 in line 12 in the off position vent their respective lines to the atmosphere to permit draining water out of the pressure lines. In the on position communication is afforded between line 22 and line 10, and line 23 and line 12. Gage 24 is connected to line 22 and continuously gives an indication of the pressure in this line. Since the pressure on gage 24 represents the pressure at stand pipes 5, the dial can be graduated to read gross weight of the seaplane directly. Pressure gage 25 responds to the differential in pressure between points on the hull, one located under the wing in the plane of the aerodynamic center of gravity and the other considerably aft of the center of gravity. This gage can, therefore, be calibrated to read the center of gravity of the sea plane measured in percent of the mean aerodynamic chord of the airplane wing. It should be pointed out that while there is a definite predetermined aerodynamic center of gravity for the craft, the center of gravity of the craft and load can vary over a limited range provided that its location is known so that the proper precautions may be taken to trim the craft for take-off. Each airplane has an optimum center of gravity for best take-off and flying characteristics and it is usually expressed in percent M. A. C. (mean aerodynamic chord). It should be noted that the differential in pressure between lines 22 and 23 as indicated on gage 25 is proportional to the center of gravity, but is subject to change with each change of the gross weight of the craft. To interpret the indication of the center of gravity on gage 25, the value of the gross weight should be determined. This is done by locating stand pipes 5 at points substantially in the plane of the average aerodynamic center of gravity in the aircraft. By utilizing the pressure at stand pipes 5 due to the gross weight of the craft, a simple correction can be introduced into the differential in pressure reading indicated on the dial of gage 25 to give accurate values of center of gravity for different values of gross weight.

Figure 5 shows a panel having a gross weight indicator and center of gravity indicator. From the positions of the dial shown in Figure 5 the indicated gross weight would be 100,000 pounds and for an indicated gross weight of 100,000 pounds the center of gravity dial indicates that the center of gravity would be about 35% M. A. C.

Figure 6:
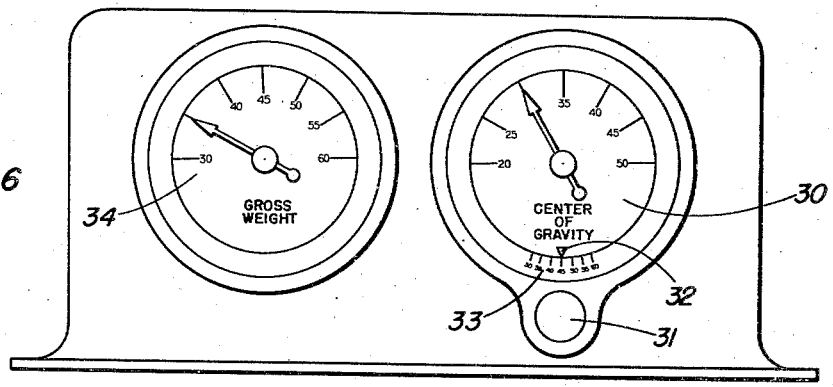

The dial arrangement shown in Figure 6 contemplates a gross weight indicating dial and a dial 30 which is mounted to be turned about its center by knob 31. Indicator 32 mounted on dial 30 can be adjusted by knob 31 to register with the value of gross weight on scale 33 which corresponds to the indicated value of gross weight on dial 34. In this way the pointer on the center of gravity indicator will give a direct reading value of center of gravity of the seaplane.

Figure 7:
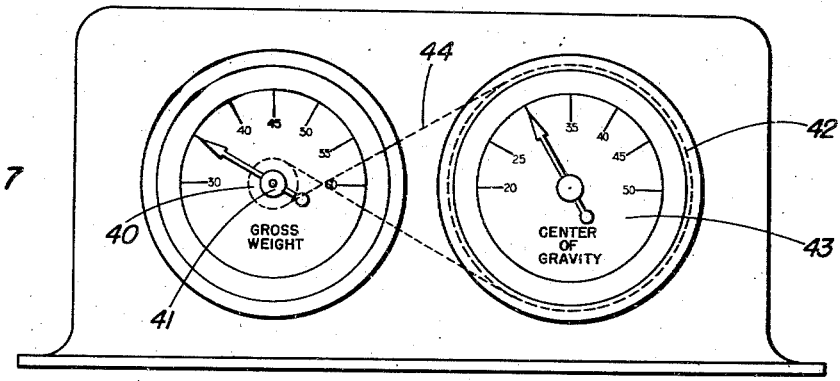

Figure 7 shows an arrangement of indicators for center of gravity and gross weight in which a pulley 40 is mounted to turn with the shaft 41 of the pointer. A second pulley 42 is mounted to turn dial 43 of the center of gravity indicator which is independent of the center of gravity pointer and shaft. Belt or cord 44 around the two pulleys causes the center of gravity dial to shift its position relative to the pointer with changes in gross weight so that the indication of center of gravity is continuously corrected with variations of gross weight of the seaplane.

From the above description it can be seen that the gross weight and center of gravity of the seaplane afloat can be determined under all conditions of loading. The method of determining center of gravity and gross weight can be carried out in several ways, depending upon the choice of apparatus.

It is to be understood that certain changes, alterations, modifications and substitutions can be made without departing from the spirit and scope of the appended claims.

I claim:

1. An apparatus for determining the center of gravity and gross weight of a seaplane afloat comprising means for measuring water pressure on the seaplane hull under the wing near the plane of the areodynamic center of gravity, means for measuring water pressure on the seaplane hull at a point remote from said first mentioned point, means connected to said first pressure measuring means to give an indication of gross weight of said seaplane, and means connected to said first and second pressure measuring means responsive to the differential in pressures measured thereby to give an indication of the center of gravity of the seaplane, said center of gravity indicating means including means to correct the indicated center of gravity with changes in gross weight of said seaplane.

2. A seaplane weight and balance indicator comprising a pressure responsive device under the wing of a seaplane substantially in the plane of the areodynamic center of gravity, a second pressure responsive device located on the hull at a remote point aft of said first mentioned device, pressure lines extending from said pressure responsive devices to an instrument panel which pressure lines have pressures therein corresponding to the water pressure on the outside of the seaplane hull at said points, said instrument panel having mounted thereon a direct pressure measuring gage and a differential pressure measuring gage, said lines from said pressure responsive devices being connected to said differential pressure measuring gage to indicate the differential in pressure on said gage, said direct pressure measuring gage being connected to said line from said first mentioned pressure measuring device, said direct pressure measuring gage calibrated to read the gross weight of said seaplane and means on said differential pressure measuring gage to correct the indication of center of gravity in accordance with changes in gross weight of the seaplane.

3. An apparatus for measuring center of gravity of a seaplane afloat comprising a pair of pressure responsive devices located on each side of the seaplane hull under the wing substantially in the plane of the areodynamic center of gravity, a second pressure responsive device located at a point remote from said first pressure responsive devices on the aft part of said hull, a pair of pressure lines extending from said pressure responsive devices to pressure measuring instruments, said pressure lines having pressures therein corresponding to the water pressure on the seaplane hull at known depths at the above mentioned locations, a differential pressure gage connected to said lines responding to the differential in pressure in said lines to give an indication of center of gravity of the seaplane, a direct pressure gage connected to said first mentioned pressure responsive devices which give an indication of the gross weight of the seaplane, means on said differential pressure gage to correct the indication of center of gravity in accordance with changes in indications of the gross weight of the seaplane.

4. An apparatus for measuring center of gravity of a seaplane afloat comprising, three standpipes secured to the seaplane hull, two of said standpipes located substantially in the plane of the areodynamic center of gravity and the third standpipe located aft and remote from said first mentioned standpipes, said standpipes each comprising an elongated chamber in communication with the water outside the hull through a small diameter tube so that the water level in the chamber will correspond to the water line outside the hull, a pressure line extending to a predetermined point within said chamber, said pressure line being charged with air under pressure to expel the water from the tube in the chamber by bubbling air through the chamber, said first mentioned standpipes being interconnected and connected to a pressure gage, which pressure gage reads the pressure required to expel air from the pressure line through said standpipes thus giving an indication of gross weight of said seaplane, a second differential pressure gage connected to said pressure lines responsive to the difference in pressure between the first two standpipes and the third mentioned standpipe, said differential in pressure gage calibrated to give an indication of the center of gravity of a seaplane hull, means on said center of gravity indicating gage to indicate a corrected value of center of gravity with variations in the gross weight of the seaplane.

PAUL A. PIPER.